United States Patent
Pinder

(10) Patent No.: US 8,693,692 B2
(45) Date of Patent: Apr. 8, 2014

(54) DIRECT DELIVERY OF CONTENT DESCRAMBLING KEYS USING CHIP-UNIQUE CODE

(75) Inventor: Howard Pinder, Norcross, GA (US)

(73) Assignee: Cisco Technology, Inc., San Jose, CA (US)

( * ) Notice: Subject to any disclaimer, the term of this patent is extended or adjusted under 35 U.S.C. 154(b) by 1090 days.

(21) Appl. No.: 12/050,406

(22) Filed: Mar. 18, 2008

(65) Prior Publication Data

US 2009/0238367 A1  Sep. 24, 2009

(51) Int. Cl.
- *H04L 9/00* (2006.01)
- *H04L 9/08* (2006.01)
- *H04L 29/06* (2006.01)
- *H04L 9/06* (2006.01)

(52) U.S. Cl.
CPC ............. *H04L 63/0428* (2013.01); *H04L 9/06* (2013.01); *H04L 9/08* (2013.01)
USPC ........................................... 380/279; 380/44

(58) Field of Classification Search
CPC .......... H04L 63/0428; H04L 9/06; H04L 9/08
USPC .............................. 380/279, 44; 713/190–194
See application file for complete search history.

(56) References Cited

U.S. PATENT DOCUMENTS

| | | | | |
|---|---|---|---|---|
| 4,433,207 A | * | 2/1984 | Best ............................... | 713/190 |
| 6,089,454 A | * | 7/2000 | Sadler ........................... | 235/383 |
| 6,965,674 B2 | * | 11/2005 | Whelan et al. ................ | 380/270 |
| 7,496,756 B2 | * | 2/2009 | Oka et al. ...................... | 713/175 |
| 7,724,907 B2 | * | 5/2010 | Candelore ..................... | 380/281 |
| 7,818,584 B1 | * | 10/2010 | Joyce et al. ................... | 713/189 |
| 7,826,619 B2 | * | 11/2010 | Hanaoka ....................... | 380/277 |
| 2003/0204504 A1 | * | 10/2003 | Stuy et al. ......................... | 707/8 |
| 2004/0139329 A1 | * | 7/2004 | Abdallah et al. .............. | 713/182 |
| 2004/0146163 A1 | * | 7/2004 | Asokan et al. ................ | 380/277 |
| 2006/0072748 A1 | * | 4/2006 | Buer .............................. | 380/44 |
| 2006/0092049 A1 | * | 5/2006 | Dellow .......................... | 341/50 |
| 2007/0033631 A1 | * | 2/2007 | Gordon et al. ................ | 725/132 |
| 2008/0131861 A1 | * | 6/2008 | Redd et al. .................... | 434/362 |
| 2008/0148067 A1 | * | 6/2008 | Sitrick et al. ................. | 713/193 |
| 2008/0150702 A1 | * | 6/2008 | Neill et al. ................. | 340/10.42 |
| 2008/0219449 A1 | * | 9/2008 | Ball et al. ..................... | 380/277 |
| 2008/0294914 A1 | * | 11/2008 | Lee et al. ...................... | 713/193 |

OTHER PUBLICATIONS

Infineon White Paper: TPM Key Backup and Recovery V0.95 Sep. 21, 2006.*

* cited by examiner

*Primary Examiner* — Saleh Najjar
*Assistant Examiner* — Oleg Korsak
(74) *Attorney, Agent, or Firm* — Merchant & Gould

(57) ABSTRACT

Systems and methods of direct delivery of content descrambling keys using chip-unique code are described herein. One such method includes receiving a unique chip identifier from a digital subscriber communications terminal; determining a chip key associated to the chip identifier; encrypting a service instance using the chip key; and transmitting the encrypted service instance. One such system includes a chip key server configured to store a plurality of chip identifiers, each identifier associated with a chip key, and configured to receive a unique chip identifier from a digital subscriber communications terminal; and an encryptor configured to encrypt a service instance using the chip key associated with the unique chip identifier, the chip key provided by the chip key server.

17 Claims, 8 Drawing Sheets

DIRECT DELIVERY OF CONTENT DESCRAMBLING KEYS USING CHIP-UNIQUE CODE

TECHNICAL FIELD

The present disclosure is generally related to communications and, more particularly, is related to systems and methods for controlled access of communications.

BACKGROUND

One way of distributing information is to broadcast it, that is, to place the information on a medium from which it can be received by any device that is connected to the medium. Television and radio are well-known broadcast media. If one wishes to make money by distributing information on a broadcast medium, there are a several alternatives. One is to find sponsors to pay for broadcasting the information. Another is to permit access to the broadcast information only to those who have paid for it. This is generally done by broadcasting the information in scrambled or encrypted form. Although any device that is connected to the medium can receive the scrambled or encrypted information, only the devices of those users who have paid to have access to the information are able to unscramble or decrypt the information.

A service distribution organization, for example a cable television company or a satellite television company, provides its subscribers with information from a number of program sources, that is, collections of certain kinds of information. For example, the History Channel is a program source that provides television programs about history. Each program provided by the History Channel is an "instance" of that program source. When the service distribution organization broadcasts an instance of the program source, it encrypts or scrambles the instance to form an encrypted instance. An encrypted instance contains instance data, which is the encrypted information making up the program.

An encrypted instance is broadcast over a transmission medium. The transmission medium may be wireless or it may be "wired", that is, provided via a wire, a coaxial cable, or a fiber optic cable. It is received at a large number of digital subscriber communication terminals (DSCT). The function of a DSCT is to determine whether an encrypted instance should be decrypted and, if so, to decrypt it to produce a decrypted instance comprising the information making up the program. This information is delivered to a television set. Known DSCTs include decryptors to decrypt the encrypted instance.

Subscribers generally purchase services by the month (though a service may be a one-time event), and after a subscriber has purchased a service, the service distribution organization sends the DSCT belonging to the subscriber messages that are required to provide the authorization information for the purchased services. Authorization information may be sent with the instance data or may be sent via a separate channel, for example, via an out-of-band RF link, to a DSCT. Various techniques have been employed to encrypt the authorization information. Authorization information may include a key for a service of the service distribution organization and an indication of what programs in the service the subscriber is entitled to watch. If the authorization information indicates that the subscriber is entitled to watch the program of an encrypted instance, the DSCT decrypts the encrypted instance.

It will be appreciated that "encryption" and "scrambling" are similar processes and that "decryption" and "descrambling" are similar processes; a difference is that scrambling and descrambling are generally analog in nature, while encryption and description processes are usually digital.

The access restrictions are required in both analog and digital systems. In all systems, the continued technological improvements being used to overcome the access restrictions require more secure and flexible access restrictions. As more systems switch from an analog format to a digital format, or a hybrid system evolves containing both analog and digital formats, flexible access restrictions will be required.

Restricting access to broadcast information is even more important for digital information. One reason for this is that each copy of digital information is as good as the original; another is that digital information can be compressed, and consequently, a given amount of bandwidth carries much more information in digital form; a third is that the service distribution organizations are adding reverse paths which permit a DSCT to send a message to the service distribution organization, thereby permitting various interactive services.

Thus, the service distribution organizations require access restrictions which are both more secure and more flexible than those in conventional systems.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
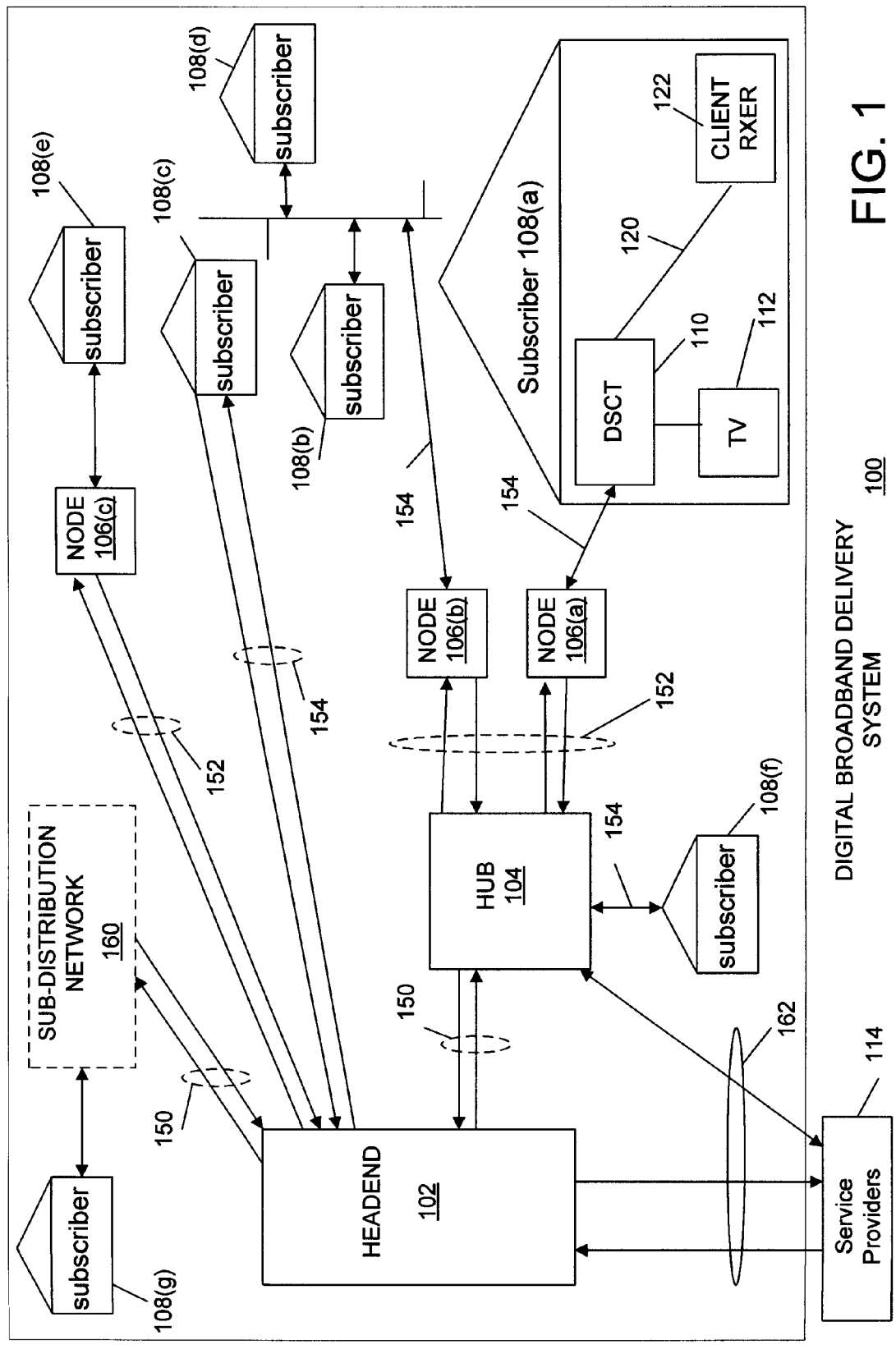
FIG. 1 is a block diagram of a broadband communications system, such as a cable television system, in which an example embodiment may be employed.

Embodiments of the present invention will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

The logic of the example embodiment(s) of the present invention can be implemented in hardware, software, firmware, or a combination thereof. In example embodiments, the logic is implemented in software or firmware that is stored in a memory and that is executed by a suitable instruction execution system. If implemented in hardware, as in an alternative embodiment, the logic can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. In addition, the scope of the present invention includes embodying the functionality of the example embodiments of the present invention in logic embodied in hardware or software-configured mediums.

Software embodiments, which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. In addition, the scope of the present disclosure includes embodying the functionality of the example embodiments of the present disclosure in logic embodied in hardware or software-configured mediums.

Any process descriptions or blocks in flow charts should be understood as representing modules, segments, or portions of code which include one or more executable instructions for implementing specific logical functions or steps in the process, and alternate implementations are included within the scope of the example embodiment of the present invention in which functions may be executed out of order from that shown or discussed, including substantially concurrently or in reverse order, depending on the functionality involved, as would be understood by those reasonably skilled in the art of the present invention. In addition, the process descriptions or blocks in flow charts should be understood as representing decisions made by a hardware structure such as a state machine known to those skilled in the art.

A description of a subscriber television system, which employs embodiments of a chip-unique content descrambling system, such as in a conditional access system, is provided hereinbelow. First an overview of a subscriber television system is given, then a description of the functionality and components of the headend is provided, and then a description of the functionality and components of a digital subscriber communication terminal (DSCT) and a client-receiver at a subscriber location is given. Non-limiting embodiments of direct delivery of content descrambling keys using a chip-unique code are described in the context of a DSCT located at the subscriber's location.

Referring to FIG. 1, a digital broadband distribution system (DBDS) 100 includes, in one example among others, a headend 102, one or more hubs 104, multiple nodes 106, a plurality of subscriber locations 108, and a plurality of digital subscriber communication terminals (DSCTs) 110. The headend 102 provides the interface between the DBDS 100 and content and service providers 114, or entitlement agents, such as broadcasters, Internet service providers, and the like via communication link 162. The communications link 162 between the headend 102 and the content and service providers 114 may be two-way. This allows for two-way interactive services such as Internet access via DBDS 100, video-on-demand, interactive program guides, monitoring of subscriber viewing patterns, etc. In an example embodiment, the hubs 104 are also in direct two-way communication with the content and service providers 114 via communication link 162 for providing two-way interactive services.

In an example embodiment, the headend 102 is in direct communication with the hubs 104 via communication link 150. In addition, the headend 102 is in direct communication with the nodes 106 via communication link 152 and in direct communication with the subscriber locations 108 via communication link 154. Whether or not the headend 102 is in direct communication with subscriber locations 108 is a matter of implementation. In an alternative embodiment, the headend 102 is in direct communication with hubs 104 and nodes 106 and in direct communication with subscriber locations 108.

In an example embodiment of systems and methods of direct delivery of content descrambling keys using a chip-unique code, the hub 104 receives content, services, and other information, which is typically in a protocol such as ATM or Ethernet, from headend 102 via transmission medium 150. The hub 104 transmits information and content via transmission medium 152 to nodes 106, which then transmit the information and content to subscriber locations 108 through transmission medium 154. Whether the hub 104 communicates directly to subscriber locations 108 or to nodes 106 is matter of implementation, and in an example embodiment, the hub 104 is also adapted to transmit information and content directly to subscriber locations 108 via transmission medium 154.

In an example embodiment, the transmission medium 150 and 152 are optical fibers that allow the distribution of high quality and high-speed signals, and the transmission medium 154 is either broadband coaxial cable or optical fiber. When the communication path from the headend 102 to the DSCT 110 includes a combination of coaxial cable and optical cable, the communication path is frequently referred to as a hybrid fiber coax (HFC) communication path. In alternative embodiments, the transmission media 150, 152 and 154 can include one or more of a variety of media, such as optical fiber, coaxial cable, satellite, direct broadcast, terrestrial digital, Multi-channel Multipoint Distribution System (MMDS) or other transmission media known to those skilled in the art. Typically, the transmission media 150, 152 and 154 are two-way communication media through which both in-band and out-of-band information are transmitted. Through the transmission media 150, 152, and 154 subscriber locations 108 are in direct or indirect two-way communication with the headend 102 and/or the hub 104. Typically, when the DSCT 110 is in satellite communication with the headend 102, the communication path is one-way from the headend 102 to the DSCT 110. However, in an alternative embodiment, the DSCT 110 and the headend 102 are in two-way communication via a telephone network (not shown).

The hub 104 functions as a mini-headend for the introduction of programming and services to sub-distribution network 160. The sub-distribution network 160 includes hub 104 and the plurality of nodes 106 connected to hub 104. Having a plurality of hubs 104 that function as mini-headends facilitates the introduction of different programming and services to different sub-distribution networks of DBDS 100. For example, the subscriber location 108(*b*), which is connected to node 106(*b*), can have different services and programming available than the services and programming available to subscriber location 108(*c*), which is connected directly to headend 102, even though the subscriber locations 108(*b*) and 108(*c*) may be in close physical proximity to each other. Services and programming for subscriber location 108(*b*) are routed through hub 104 and node 106(*b*); and hub 104 can introduce services, data and programming into the DBDS 100 that are not available through the headend 102.

At the subscriber locations 108 a decoder or a DSCT 110 provides the two-way interface between the DBDS 100 and the subscriber. The DSCT 110 decodes and further process the signals for display on a display device, such as a television set (TV) 112 or a computer monitor, among other examples. Those skilled in the art will appreciate that in alternative embodiments the equipment for first decoding and further processing the signal can be located in a variety of equipment, including, but not limited to, a DSCT, a computer, a TV, a monitor, or an MPEG decoder, among others.

The DSCT 110 is preferably in communication with client-receiver 122 via communication link 120. In an example embodiment, the communication link 120 may be wireless such as, but not limited to, Institute for Electronics and Electrical Engineers (IEEE) standards 802.11a, 802.11b, 802.11g, HiperLAN/2, HomeRF 2, Bluetooth 2, and 802.15.3. In alternative embodiments, the DSCT 110 is in communication with multiple client-receivers via one or more communication links, such as, but not limited to, twisted-wire or Ethernet, telephone line, electrical power line and coaxial cable.

The client-receiver 122 is in two-way communication with the DSCT 110 and may receive information and content therefrom. In one embodiment, the DSCT 110 acts as a proxy for the client-receiver 122, and in that case, the headend 102 transmits content to the DSCT 110, which then processes the content before re-transmitting them to the client-receiver 122. In this embodiment, the headend 102 may or may not be aware of the client-receiver 122. Because the DSCT 110 proxies for the client-receiver 122, the headend 102 need only communicate with the DSCT 110. In another embodiment, the client-receiver 122 is acknowledged by the headend 102, and the headend 102 communicates with the client-receiver 122 through the DSCT 110. The DSCT 110 still processes messages communicated between the headend 102 and the client-receiver 122, but in this embodiment, the DSCT 110 acts as a facilitator, not as a proxy, for the client-receiver 122. For example, in one embodiment, the DSCT 110 authenticates and when necessary decrypts messages from the headend 102 that are addressed to the client-receiver 122. In another embodiment, the DSCT 110 is a gateway for the client-receiver 122 and merely passes communication between the client-receiver 122 and the headend 102. In yet another embodiment, the DSCT 110 decrypts messages and other information from the headend 102 and re-encrypts them for the client-receiver 122.

Figure 2:
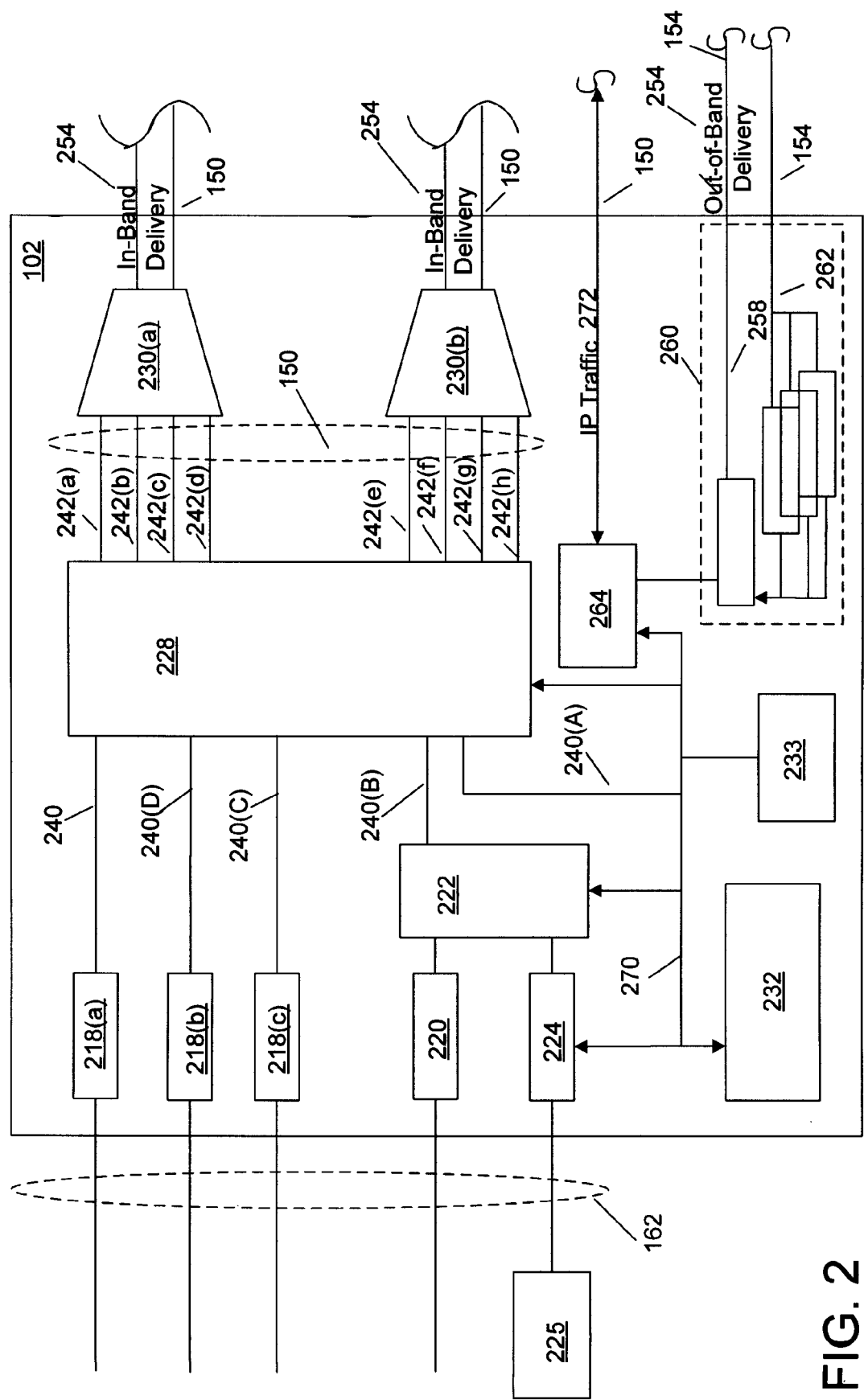
FIG. 2 is a block diagram of a headend in the broadband communication system in which an example embodiment may be employed.

Referring to FIG. 2, in a typical system of an example embodiment, the headend 102 may receive content from a variety of input sources, which can include, but are not limited to, a direct feed source (not shown), a video camera (not shown), an application server (not shown), and other input sources (not shown). The input signals are transmitted from the service providers 114 to the headend 102 via a variety of communication links 162, which include, but are not limited to, content servers, satellites (not shown), terrestrial broadcast transmitters (not shown) and antennas (not shown), and direct lines (not shown). The signals provided by the content providers can include a single program or a multiplex of programs.

The headend 102 generally includes a plurality of receivers 218 that are each associated with a source. A program may be transmitted from the receivers 218 in the form of transport stream 240. MPEG encoders, such as encoder 220, are included for digitally encoding the program. Typically, the encoder 220 produces a variable bit rate transport stream. Prior to being modulated, some of the signals may require additional processing, such as signal multiplexing, which is performed by multiplexer 222.

A switch, such as asynchronous transfer mode (ATM) switch 224, may provide an interface to content server 225. There may be multiple content servers providing a variety of content. Service and service providers 114 (shown in FIG. 1) may download content to content server located within the DBDS 100 or in communication with DBDS 100. The content server may be located within headend 102 or elsewhere within DBDS 100, such as in a hub 104 or DSCT 110.

The content input into the headend 102 are then combined with the other information, which is specific to the DBDS 100, such as local programming and control information. The headend 102 may include a multi-transport stream receiver-transmitter 228, which receives the plurality of transport streams 240 and transmits a plurality of transport streams 242. In an example embodiment, the multi-transport stream receiver-transmitter 228 includes a plurality of modulators, such as, but not limited to, Quadrature Amplitude Modulation (QAM) modulators, that convert the received transport streams 240 into modulated output signals suitable for transmission over transmission medium 280.

In an example embodiment, the output transport streams 242 have a bandwidth of 6 MHz centered upon a frequency that is predetermined for each transport stream 242. The frequency for a given transport stream 242 is chosen such that the given transport stream will not be combined with another transport stream at the same frequency. In other words, only transport streams that are modulated at different frequencies can be combined, and therefore, the frequencies of transport streams 242A-D must be different from each other because combiner 230A combines them. The transport streams 242 from the multi-transport stream receiver-transmitters 228 are combined, using equipment such as combiner 230, for input into the transmission medium 150, and the combined signals are sent via the in-band delivery path 254 to subscriber locations 108.

A system controller, such as control system 232, which preferably includes computer hardware and software providing the functions discussed herein, allows the DBDS system operator to control and monitor the functions and performance of the DBDS 100. The control system 232 interfaces with various components, via communication link 270, in order to monitor and/or control a variety of functions, including the channel lineup of the programming for the DBDS 100, billing for each subscriber, and conditional access for the content distributed to subscribers. Control system 232 provides input to the multi-transport stream receiver-transmitter 228 for setting its operating parameters, such as system specific MPEG table packet organization or conditional access information among other things.

Content may be communicated to DSCTs 110 via the in-band delivery path 254 or to DSCTs 110 connected to the headend 102 via an out-of-band delivery path 256. The out-of-band data is transmitted via the out-of-band downstream path 258 of transmission medium 154 by means such as, but not limited to, a Quadrature Phase-Shift Keying (QPSK) modem array 260, or an array of data-over-cable service interface specification (DOCSIS) modems, or other means known to those skilled in the art. Two-way communication utilizes the upstream portion 262 of the out-of-band delivery system. DSCTs 110 may transmit out-of-band data through the transmission medium 154, and the out-of-band data may be received in headend 102 via out-of-band upstream paths 262. The out-of-band data may be routed through router 264. Out-of-band control information may include, as non-limiting examples, a pay-per-view purchase instruction and a pause viewing command from the subscriber location 108 (shown in FIG. 1) to a video-on-demand type application server, and other commands for establishing and controlling sessions, such as a Personal Television session, etc. The QPSK modem array 260 may also be coupled to communication link 152 (FIG. 1) for two-way communication with the DSCTs 110 coupled to nodes 106.

The router 264 may be used for communicating with the hub 104 through transmission medium 150. Command and control information among other information between the headend 102 and the hub 104 may be communicated through transmission medium 150 using a protocol such as, but not limited, to Internet Protocol. The IP traffic 272 between the headend 102 and hub 104 may include information to and from DSCTs 110, which are connected to the hub 104.

In an example embodiment, the hub 104, which functions as a mini-headend, may include many or all of the same components as the headend 102. The hub 104 may be adapted to receive the transport-streams 242 included in the in-band path 254 and redistribute the content therein throughout its sub-distribution network 160. The hub 104 may include a QPSK modem array (not shown) that is coupled to communication links 152 and 154 for two-way communication with DSCTs 110 that are coupled to its sub-distribution network 160. Thus, it may also be adapted to communicate with the DSCTs 110 that are coupled to its sub-distribution network 160, with the headend 102, and with the service providers 114.

A traditional conditional access system (CAS) model requires a secure area in a decoder for key and entitlement storage. However, given a guaranteed two-way connection in the appropriate servers in the head end, a unique key in a transport chip, normally only used for control word transfer within the decoder, could be used to encrypt content keys from the head end. This removes the requirement for the secure area on the decoder saving the cost of a secure micro.

Figure 3:
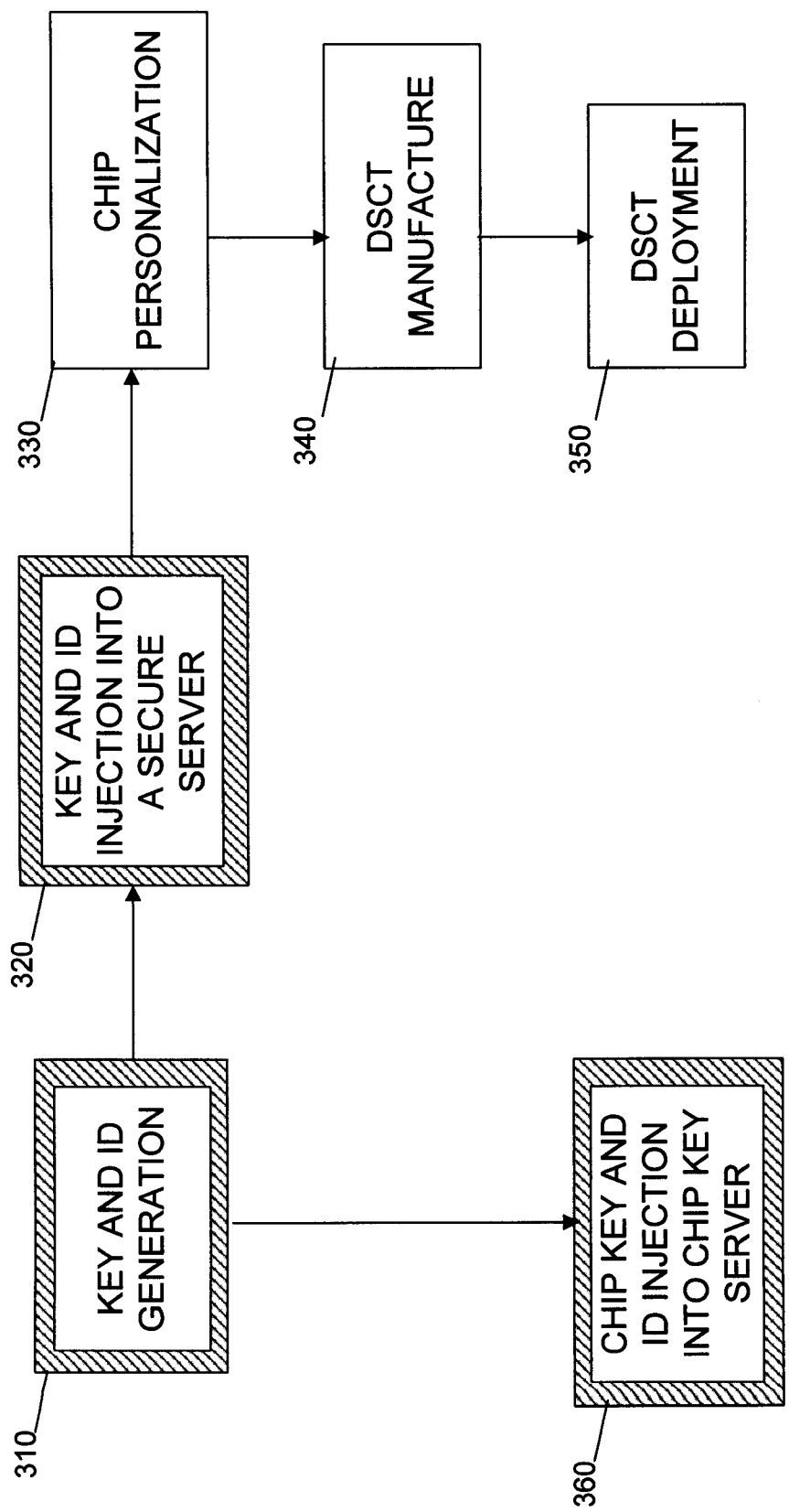
FIG. 3 is a block diagram of an example embodiment of a method of generating chip identifiers and associated chip keys and providing them to a digital subscriber communications terminal and to a chip key server.

FIG. 3 provides an example embodiment of a method 300 of generating the unique keys and providing them to the service provider and to the DSCT. The method 300 includes key and ID generation 310, ID and key injection into a secure server 320, chip personalization 330, DSCT manufacture 340, DSCT deployment 350, and key injection into chip key server 360. In block 310, each key and associated ID is generated at a secure facility. Each key and associated ID is then sent over a protected link and, in block 320, is injected into a secure server. In block 330, an unprogrammed chip is personalized with a key and associated ID from the secure server. The chip personalization may occur during chip manufacture, or, alternatively, after chip manufacture and before the manufacture of the DSCT. In an example embodiment, an unprogrammed one time programmable (OTP) device is used.

In block 340, the DSCT is manufactured, and a programmed OTP device, for example, is used in the DSCT. In block 350, the DSCT is deployed to the field to be used by a subscriber. The key and ID generated in block 310 is also sent over a protected link and, in block 360, is injected into a chip key server. The chip key server provides the key and ID information for the service encryption by the service provider. The operations of blocks 310, 320, and 360 may be undertaken in hardware security modules. These steps should be performed securely such that the keys cannot be pirated.

Figure 4:
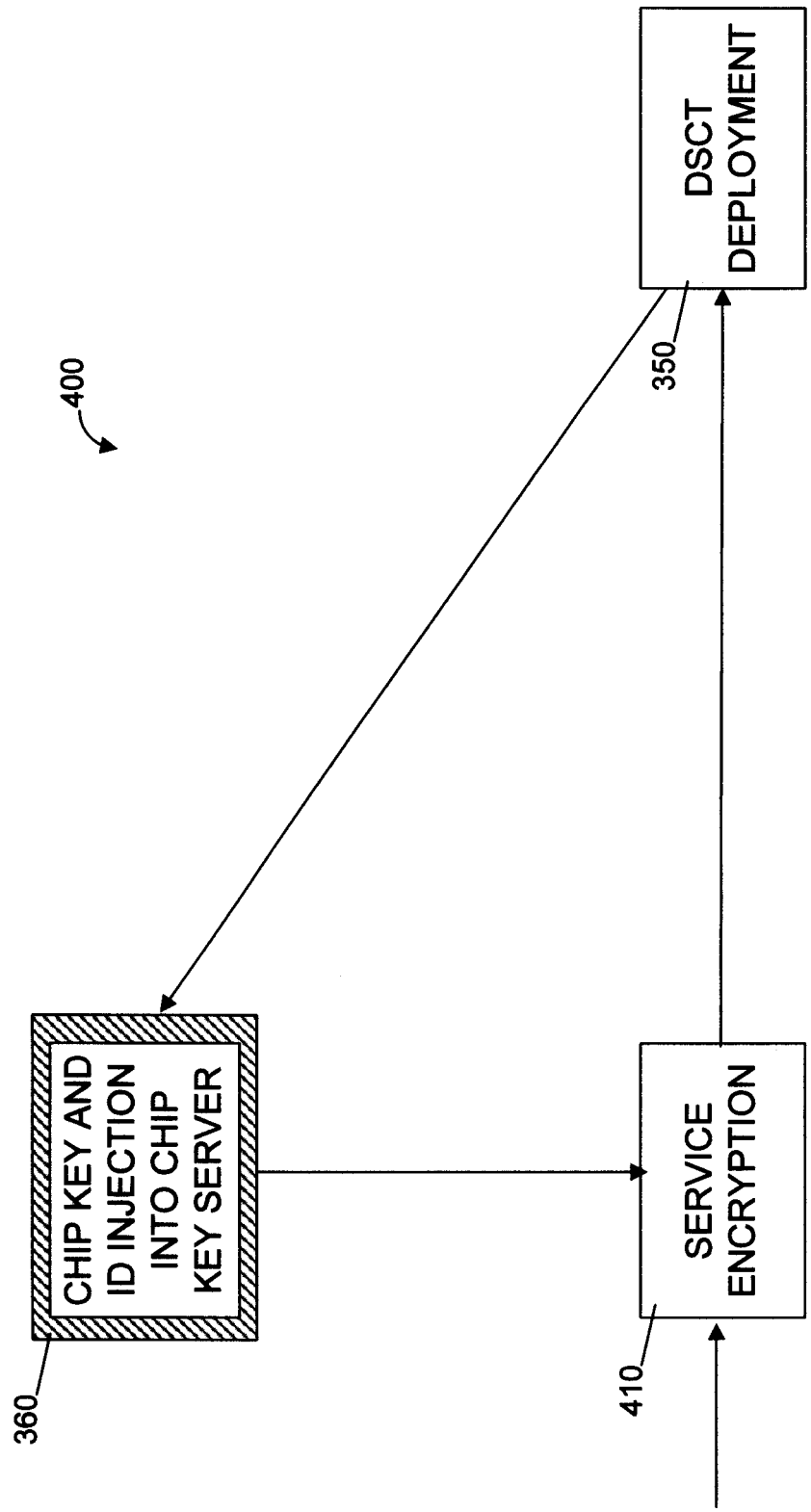
FIG. 4 is a block diagram of an example embodiment of a method for service encryption using the chip identifier and associated key as provided in the method of FIG. 3.

FIG. 4 provides an example embodiment of a method used for requesting a service by a DSCT and encryption of the service by the service provider. In block 350, a DSCT is deployed. In block 360, the Key and ID is injected into the chip key server. When the DSCT requests a service, it sends the chip ID which is hardcoded in the OTP, for example, in the DSCT to the chip key server. The chip key server sends the chip key to the service encryptor and, in block 410, the service is encrypted based on the chip key. The encrypted service is sent from the service provider, for example, at the head end, to the DSCT where it is decrypted using the key that is hardcoded into the STB.

The components of a conditional access system may perform the following functions:
 1. encrypting the service content
 2. sending the chip ID
 3. passing the keys associated with the chip ID to the encrypter, and
 4. decrypting the service content.

In an example embodiment of the conditional access system disclosed herein, a chip ID and associated key used in a particular DSCT box 113(i) is hard-coded in the DSCT box 113(i). Additionally, each broadcast service is scrambled using the advanced encryption standard (AES), and the service encryption keys for all services may change at 4 AM, for example. The headend unit that is responsible for generating new service encryption keys may generate the keys one day in advance, so that the keys for the next day can be distributed ahead of time. Once a day, every DSCT may contact a key server in the headend, and obtain a list of the service encryption keys for the next day, for all the services that the subscriber is authorized to receive. The server delivers the keys to the DSCT, encrypted with the unique key of the associated DSCT.

Additionally, an authorization bitmap used in some conditional access systems may be excluded. Instead, each service instance may be scrambled with a unique key, and the headend only sends keys to a DSCT for services it is authorized to receive. This has a significant cost advantage because the secure area in the decoder is not required. A semiconductor chip used in the DSCT has a unique chip ID and associated key hardcoded in the device. One example embodiment employs fuse technology, such that the chips are one-time programmable elements. In an alternative embodiment, the chip itself will be able to reprogram its own memory to have the unique signature in the key associated with it.

The use of AES as opposed to DES for audio/video encryption has been increasingly common. In fact, the U.S. government has published recommended time limits for how long a key can be used using AES. For top-secret data, a limit of one year usage is mandated. A two year limit is recommended for private uses. AES operates on data, which, as a non-limiting example, may be a 4×4 array of bytes. For encryption, each round of AES (except the last round) consists of four stages: AddRoundKey, SubBytes, ShiftRows, and MixColumns. In the AddRoundKey stage, each byte of the data is combined with the round key; and each round key is derived from the cipher key using a key schedule. In the SubBytes stage, a non-linear substitution step, each byte is replaced with another byte according to a lookup table. In the ShiftRows stage, a transposition step, each row of the data is shifted cyclically a certain number of steps. In the MixColumns stage, a mixing operation, which operates on the columns of the data, the four bytes are combined in each column using a linear transformation. The final round replaces the MixColumns stage with another instance of AddRoundKey.

In an example embodiment, the link from the service provider is secured by using the key, which is burned in, or programmed in, the OTP device. For each DSCT, this one-time programmable chip will have a unique key assigned to it. The chip key server is provided that key as well.

In an example embodiment, the service encryption key is changed every day. The DSCT requests from the headend all the service encryption keys for the next day, and included in the request is the chip ID of the chip within the DSCT. The headend uses the chip ID to look up the chip key from chip key server 360, and then encrypts the service key for the current and next day and delivers the encrypted service encryption key to the DSCT. The headend delivers all the keys to the DSCT for all the services that that DSCT is authorized to receive. The headend provides the service encryption key to the service encryptor, which uses the service encryption key to encrypt the service. The DSCT, meanwhile, sends the encrypted service keys to a service encryptor decryption module, which decrypts the encrypted service encryption key using the chip key, and then stores the decrypted service encryption key or uses it to decrypt the service.

Thus, a secure micro used in typical conditional access systems can be eliminated. Internet protocol television (IPTV) is an example of a system which does not require the secure micro functionality. There may be additional changes to some conditional access system models to enable the direct delivery of content descrambling keys using a chip-unique code in an IPTV system. The model disclosed herein may use an always-on connection to the headend instead of a multi-session key (MSK). An MSK is one key that is used to encrypt the control words for many service instances. With an MSK, an authorization bitmap is produced that includes all the programs a subscriber could possibly decrypt. The bitmap identifies which ones that the subscriber is really authorized to decrypt. So, as an optimization, a different MSK may be included for every available program, eliminating the need for the bit map. However, there may not be enough room on a secure micro for all those keys. Entitlement control messages (ECMs) are also not needed anymore because the control words do not change every few seconds. Instead, the control words only change daily. Therefore, the dual model of an ECM and EMM collapses to a single key model.

A DSCT for IPTV may be cost-sensitive; so being able to eliminate the secure micro is significant. An IPTV DSCT is similar to a cable system DSCT, but does not include a quadrature amplitude modulation (QAM) demodulator receiver. Instead, some IPTV DSCT embodiments receive IP packets from a LAN. Other IPTV DSCT embodiments include a cable modem. But in traditional cable, all services are broadcast to every subscriber and the DSCT chooses which frequency to tune to for the digital channels and which program to decode from that tuned frequency. In an IPTV system, due to bandwidth constraints, every service is not broadcast to everyone. Instead, a group invitation to join a multicast group is issued. With IP multitasking located in the head end, a source for the program or service is being issued over IP or multicast. Any subscriber who wants to view a particular service joins the multicast flow. Routers in the network recognize this multicast traffic and determine whether any downstream subscriber is requesting that particular multicast stream. If one of the subscribers is requesting that stream, the packets for that stream are routed to that subscriber. Thus, changing channels amounts to joining and leaving a multicast.

Another scenario delivers IPTV streaming video content (such as, but not limited to, YouTube™) to a subscriber. Another scenario delivers content to a PC and the PC displays contents on a TV. Each of these cases employs the unique identifier in the OTP device for the encryption. This can be used on regular cable as well as on IPTV.

The programming of the OTP device may be controlled. In one embodiment, some, but not all, of the bits are one-time programmable. Some of the bits may be reprogrammable. In such embodiments, the service provider could send a special message down to the chip and the chip could blow a fuse to disable the output port. (An IEEE 1394 output port is a non-limiting example.) Control of the OTP device may reside in the chip fabrication factory in the DSCT factory, or in the field before the DSCT is placed in the home. In an example embodiment, the chip fabrication factory blows the fuses. The fabrication area is generally a very secure area and the chips may be programmed using a "black box" where the key is supplied to the "black box" controlled by the DSCT vendor. The keys may be digitally injected into the "black box."

Figure 5:
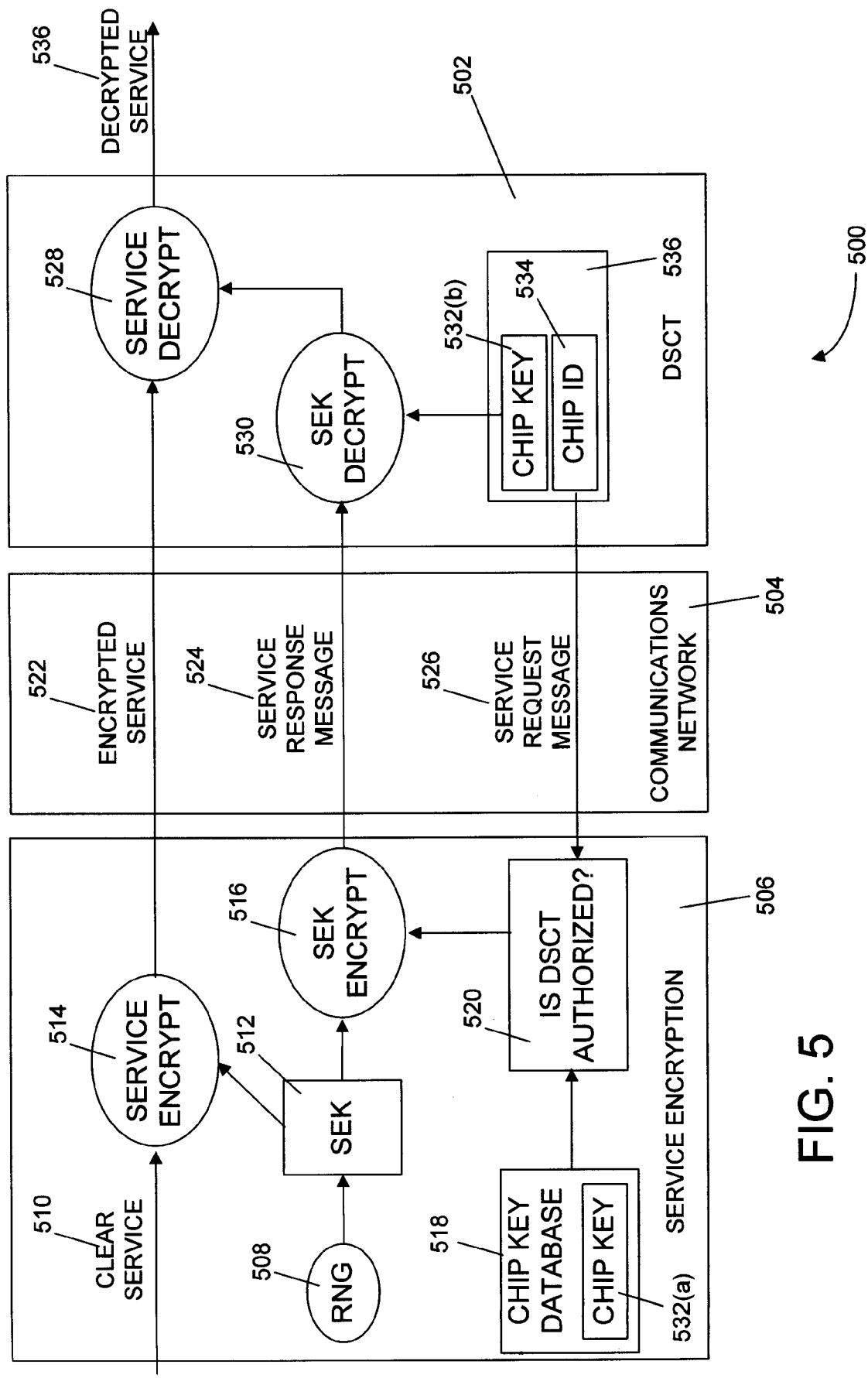
FIG. 5 is a block diagram of an example embodiment of a method of encrypting a service instance.

FIG. 5 provides an overview of a system 500 for limiting access to broadcast information. Such systems will be termed as "conditional access systems." A service distribution organization, a CATV company or a satellite television company (as non-limiting examples), provide subscribers with information from a number of services, that is, collections of certain kinds of information. For example, the History Channel is a service that provides television programs about history. Each program provided by the History Channel is an "instance" of that service. When digital subscriber communication terminal (DSCT) 502 requests a service, DSCT 502 transmits chip ID 534 in service request message 526 to service encryption module 506 over communications network 504. Chip key 532(*b*), as detailed above, may be an OTP device, and is encoded with chip ID 534 and chip key 532(*b*). Service encryption module 506 receives service request message 526 for processing.

In an example embodiment, service encryption module 506 includes service encryptor 514, random number generator 508, service encryption key encryption module 516, chip key database 518, and service authorization module 520. When service request message 526 is received in service encryption module, service authorization module 520 determines if DSCT 502 is authorized to receive the requested service. If DSCT 502 is authorized to receive the service, authorization module 520 obtains chip key 532(*a*) for encryption of service encryption key (SEK) 512. Random number generator 508 or other key generator generates SEK 512, which is provided to service encryptor 514 for the encryption of clear service 510 to generate encrypted service 522. SEK 512 contains information to decrypt the encrypted portion of the associated instance data.

Chip key 532(*a*) may be provided from chip key database 518. Chip key database 518 may contain a list that correlates chip key 532(*a*) with chip ID 534 for every DSCT that service encryption module 506 services. In one example embodiment, service encryption module 506 resides in headend 102. Chip key 532(*a*) provided by chip key database 518 may be used to encrypt SEK 512 in SEK encryption module 516. The requested service, clear service 510, is also encrypted or scrambled. It is encrypted using service encryptor 514 to form encrypted service 522. Encrypted service 522 contains service instance data, which is the encrypted information making up the program. A given chip key may be sent daily.

Encrypted instance 522 and service response message 524 are transmitted over communications network 504. Communications network 504 may be wireless or it may be "wired", that is, provided via a wire, a coaxial cable, or a fiber optic cable, among others. Service response message 524 may be interleaved with encrypted service 522, or service response message 524 may be sent via a separate channel, for example, an out-of-band RF link. Encrypted service 522 and/or service response message 524 may be received in a large number of DSCTs, or a single DSCT, each of which may be attached to a television set. DSCT 502 determines whether encrypted instance 522 should be decrypted and if so, decrypts it to produce decrypted instance 536, which is delivered to a television set (for example).

As shown in FIG. 5, DSCT 502 includes service decrypt module 528, SEK decrypt module 530, and key chip 536. SEK decrypt module 530 uses chip key 532(*b*), which matches chip key 532(*a*), to decrypt service response message 524 and recover SEK 512. SEK 512 is used by service decryption module 528 to decrypt encrypted service 522 to produce decrypted service 536. Chip ID 534 and chip key 532(*b*) may be hard-coded into key chip 536. Alternatively, only chip key 534 may be hard-coded in key chip 536.

The encryption and decryption techniques used for service instance encoding and decoding belong to two general classes: symmetrical key techniques and public key techniques. A symmetrical key encryption system is one in which each of the entities wishing to communicate has a copy of a key; the sending entity encrypts the message using its copy of the key and the receiving entity decrypts the message using its copy of the key. An example symmetrical key encryption-decryption system is the Digital Encryption Standard (DES) system. A public key encryption system is one in which each of the entities wishing to communicate has its own public key-private key pair. A message encrypted with the public key can only be decrypted with the private key and vice-versa. Thus, as long as a given entity keeps its private key secret, it can provide its public key to any other entity that wishes to communicate with it. The other entity simply encrypts the message it wishes to send to the given entity with the given entity's public key and the given entity uses its private key to decrypt the message. Where entities are exchanging messages using public key encryption, each entity must have the other's public key. The private key can also be used in digital signature operations, to provide authentication. Further information on encryption generally and symmetrical key and public key encryption in particular can be found in Bruce Schneier, Applied Cryptography, John Wiley and Sons, New York, 1994.

The design of an encryption system for a given application involves a number of considerations. As will be seen in the following, considerations that are particularly important in the broadcast message environment include:

Key security: A symmetrical key system is useless if a third party has access to the key shared by the communicating parties, and a public key system is also useless if someone other than the owner of a given public key has access to the corresponding private key.

Key certification: Certification allows the recipient of a key to be sure that the key he or she has received is really a key belonging to the entity to which the recipient wishes to send an encrypted message, and not a key belonging to another entity which wishes to intercept the message.

Message authentication: Authentication allows the recipient of a message to be sure that the message is from the party it claims to be from, and/or that the message has not been altered.

Speed of encryption and decryption: In general, symmetrical key encryption systems are faster than public key encryption systems and are preferred for use with real-time data.

Key size: In general, the longer the key used in an encryption system, the more resources will be required to break the encryption and thereby gain access to the message.

All of these considerations are influenced by the fact that the environment in which a conditional access system operates must be presumed to be hostile. Many customers of broadcast services see nothing wrong with cheating the service provider and have nothing against physically tampering with the portion of the conditional access system that is contained in the receiver or using various cryptographic attacks to steal keys or to deceive the receiver about the source of the messages it receives. Moreover, the providers of the systems that actually broadcast the services do not necessarily have the same interests as the providers of the service content, and therefore need to control not only who can access a given instance of a service, but also what entities can offer services to a given receiver.

In overview, the encryption system disclosed herein may use symmetrical key encryption techniques to encrypt and decrypt the service instance and public key encryption techniques to transport a copy of one of the keys used in the symmetrical key techniques of the key from the service provider to the DSCT.

Figure 6:
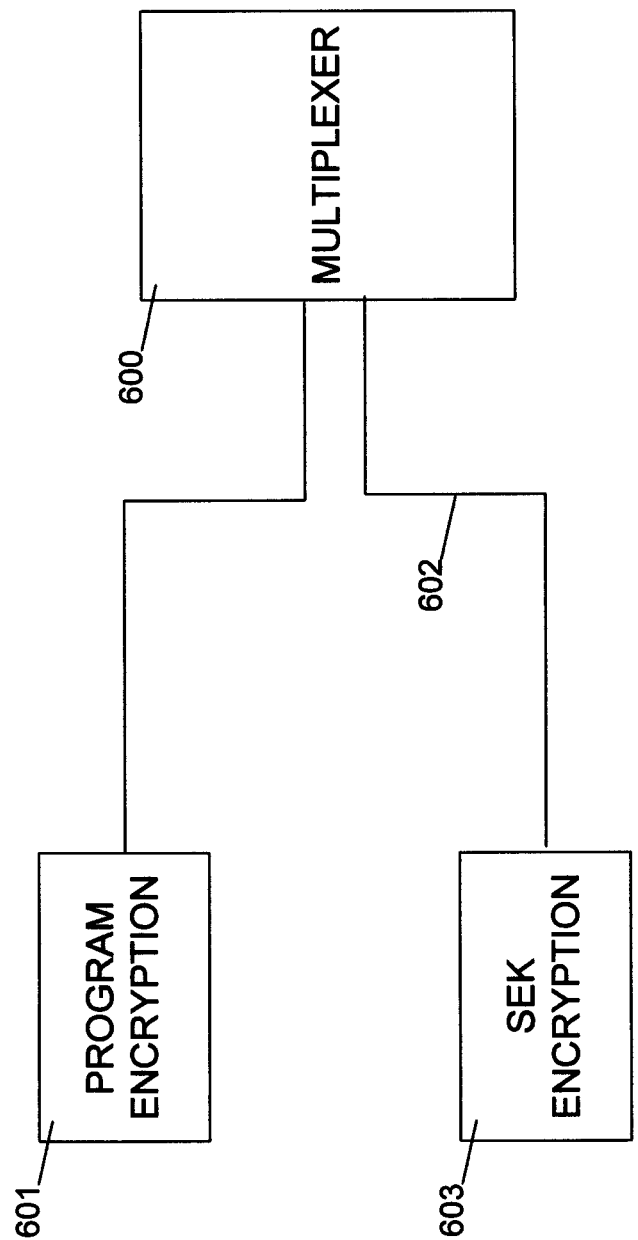
FIG. 6 is a block diagram of an example embodiment of encrypting a service instance by combining the encrypted service encryption key with the encrypted program using an MPEG-2 protocol.

In FIG. 6, clear services such as the elementary digital bit streams which comprise MPEG-2 programs are sent through a first level encryption (Program Encrypt 601), which is preferably a symmetric cipher such as the AES algorithm, as a non-limiting example. Each elementary stream may be individually encrypted and the resulting encrypted streams are sent to multiplexer 600 to be combined with other elementary streams and private data, such as conditional access data. Encrypted SEK 602 produced by SEK encryption module 603 may also be sent to multiplexer 600 for transmission with the elementary stream data.

Figure 7:
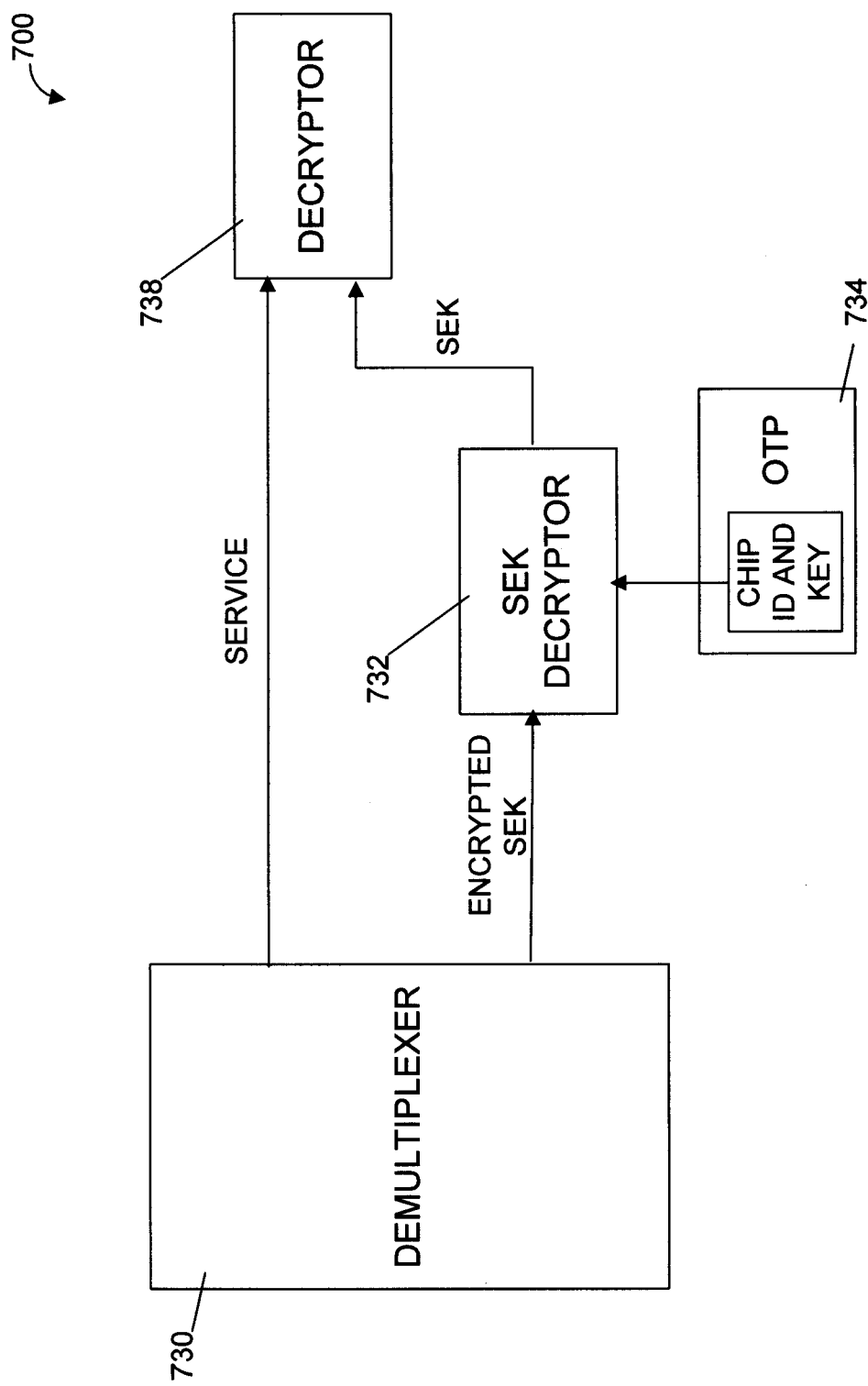
FIG. 7 is a block diagram of an example embodiment of decrypting a service instance by demultiplexing the encrypted service encryption key from the encrypted program using an MPEG-2 protocol.

In FIG. 7, the corresponding chip key and chip ID are hardcoded in the OTP of DSCT 700. The demultiplexer 730 can select a service based on the encrypted SEK that is multiplexed with the service, by decrypting the SEK using the chip key and the chip ID hardcoded on OTP 734, for example.

Figure 8:
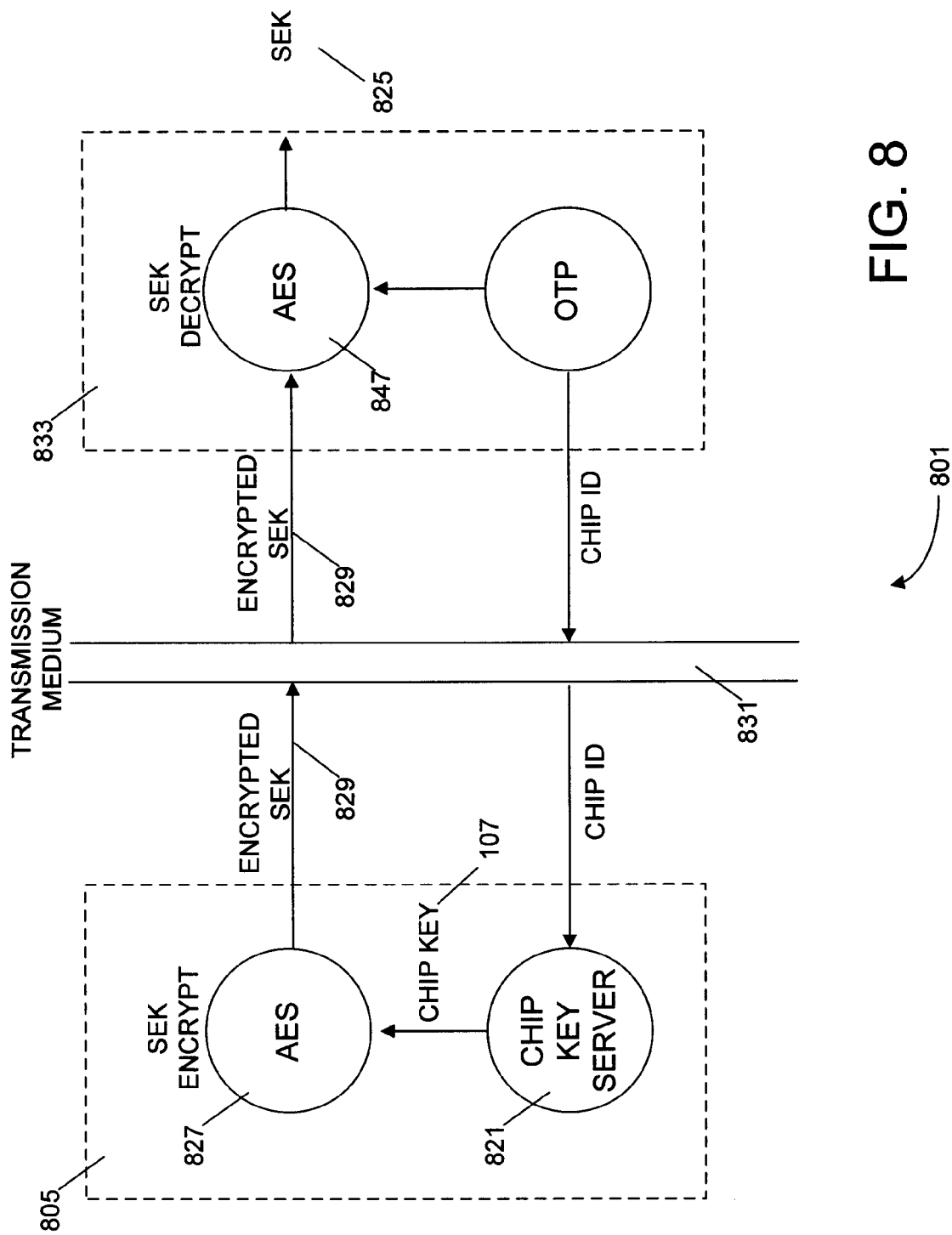
FIG. 8 is a block diagram of an example embodiment of decrypting a service instance by demultiplexing the encrypted service encryption key from the encrypted program using an MPEG-2 protocol.

FIG. 8 presents more details about an example implementation of the system of FIGS. 6 and 7. SEK encryption/decryption system 801 has two main components: key encryption component 805 and key decryption component 833. The two are connected by a transmission medium 831, which may be any medium which will carry a message from key encryption component 805 to key decryption component 833. Key decryption component 833 may be implemented in a DSCT or in any device which has the necessary computation power, for example, in a personal computer or work station or an "intelligent" television set. Key encryption component 805 may be implemented in equipment located at the head end of a broadcasting system such as a cable television (CATV) or satellite TV system. In some embodiments, however, the head end may be provided with already-encrypted instances of the service. The transmission medium may be storage media, where the service origination point is the manufacturer of the media, and the service reception component may be the element which reads the storage media. For example, the transmission medium can be a CD-ROM, DVD, floppy disk, or any other medium that can be transferred, physically, electronically, or otherwise.

Beginning with key encryption component 805, chip key server 821 may be used to acquire chip key 107. Chip key 107 is used to encrypt the SEK. Encrypted SEK 829 may be sent together with encrypted content to DSCT 833. Chip key 107 for a given encrypted SEK 829 may arrive at DSCT 833 before the encrypted content does. In an example embodiment, the SEK is encoded according to the MPEG-2 standard. The standard provides for a transport stream, which includes a number of component streams. Some of these carry content and others carry the SEK.

The above use of chip key and hard coded identifiers in the DSCT to control access to instances of service thus allows that no entitlement agent will have access to DSCT 833 without permission of the conditional access authority and that no DSCT 833 will have access to an instance of a service without permission of the entitlement agent for the service. It also makes it possible for the entitlement agent to be in complete control of the service. Access to the service is defined by the chip key 107, and may be sent by the headend to DSCT 833 independently of the service distribution organization.

The foregoing has described the conditional access system in terms of chip keys and in terms of the manner in which the instances are encrypted and decrypted. The conditional access system as just described will work with any communications arrangement which permits an instance of a service together with chip keys and other broadcast messages to be delivered to a DSCT. The conditional access system is, however, particularly well-suited for use in a modem digital broadband delivery system.

It should be emphasized that the above-described embodiments of the present disclosure are merely possible examples of implementations, set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

Therefore, at least the following is claimed:

1. A method comprising:
receiving a service instance request from a digital subscriber communications terminal (DSCT), the service instance request comprising a unique chip identifier for the digital subscriber communications terminal, wherein the unique chip identifier is generated and hard-coded in the digital subscriber communications terminal on a one time programmable (OTP) memory before deploying the digital subscriber communications terminal to be used by a subscriber, wherein the OTP memory comprises a fuse, and wherein the fuse is configured to disable an output port of the DSCT based on receiving a command from at least one of: a manufacturer of the DSTC and a service provider;
sending a request to a chip key server for a chip key associated with the unique chip identifier;
receiving the chip key from the chip key server, wherein the chip key and the unique chip identifier are created for the DSCT at the time of manufacture, and are injected in the chip key server over a secured link;
generating a service encryption key for the requested service instance;
encrypting the requested service instance using the service encryption key;
encrypting the service encryption key with the chip key;
sending the encrypted service encryption key to the DSCT, wherein the service encryption key is changed every day, wherein sending the encrypted service encryption key comprises sending the encrypted service encryption key only to the DSCT authorized to receive the service instance, and wherein sending the encrypted service encryption comprises excluding an authorization bitmap and an entitlement control message (ECM); and
transmitting the requested service instance encrypted with the service encryption key.

2. The method of claim 1, further comprising generating the chip identifier and the associated chip key using a unique signature.

3. The method of claim 1, further comprising programming a semiconductor device with the chip identifier, the chip identifier being obtained from the secure server.

4. The method of claim 3, wherein the chip identifier is reprogrammable on the semiconductor device, wherein the chip identifier being reprogrammable comprises the chip reprogramming its own memory to have the unique signature.

5. The method of claim 2, wherein the generating the chip identifier and the associated chip key is performed within a hardware protection module.

6. A system comprising:
a chip key server configured to store a plurality of chip identifiers, each chip identifier associated with a chip key, wherein the chip key includes a unique signature linked to the unique chip identifier, and wherein the unique chip identifier and the chip key are generated and hard-coded in the digital subscriber communications terminal (DSCT) on a one time programmable (OTP) memory before deploying the DSCT to be used by a subscriber, and wherein the chip key and the unique chip identifier are injected in the chip key server over a secured link;
a headend configured to:
receive a service instance request from the DSCT, the service instance request comprising the unique chip identifier for the DSCT,
request the chip key server for the chip key associated with the unique chip identifier,
receive a service encryption key for the requested service instance;
a service encryptor configured to encrypt the requested service instance using the service encryption key, wherein the service encryption key is changed every day;
a service key encryptor configured to encrypt the service encryption key using the chip key associated with the unique chip identifier, wherein the encrypted service encryption key is sent at least one day in advance to the DSCT, wherein the encrypted service encryption key is sent only to the DSCT authorized to receive the service instance, and wherein sending the encrypted service encryption comprises excluding a need for an authorization bitmap and an entitlement control message (ECM);

wherein the headend is further configured to send the requested service instance, encrypted with the service encryption key and excluding an authorization bitmap to the DSCT; and wherein the OTP memory comprises a fuse, wherein the fuse is configured to disable an output port of the DSCT based on receiving a command from at least one of: a manufacturer of the DSTC, the headend, and a service provider.

7. The system of claim 6, further comprising a generator configured to generate the plurality of chip identifiers and associated chip keys.

8. The system of claim 7, wherein the generator provides the plurality of chip identifiers and associated chip keys to the chip key server.

9. The system of claim 7, wherein the generator provides the plurality of chip identifiers and associated chip keys to a secure server.

10. The system of claim 9, further comprising a chip personalization station configured to receive a chip identifier of the plurality of chip identifiers in the secure server and to hardcode the chip identifier into the one time programmable memory.

11. A method comprising:
receiving, from a headend, a plurality of encrypted services at a receiver, each of the encrypted services having an encrypted service encryption key unique to each encrypted service, wherein the headend is configured to:
  receive request from the receiver for a plurality of service instances, each request comprising an unique chip identifier for the receiver,
  request, from a chip key server, a chip key associated with the unique chip identifier, wherein the chip key server is configured to store the chip key corresponding to the unique chip identifier,
  receive a service encryption key for each the plurality of service instances,
  encrypt the plurality of requested service instances using the service encryption key;
  encrypt the service encryption key with the chip key,
  send the encrypted service encryption key, wherein the encrypted service encryption key is sent only to the DSCT authorized to receive the service instance, and wherein sending the encrypted service encryption comprises excluding a need for an authorization bitmap and an entitlement control message (ECM), and
  send the plurality of encrypted service instances encrypted with the service encryption key to the receiver;

receiving, at the receiver, the encrypted service encryption key for each of the plurality of encrypted services, wherein the encrypted service encryption key is received at least one day in advance at the receiver, and wherein the service encryption key is changed every day;

decrypting, in the receiver, each of the encrypted service encryption keys using a chip key, wherein the unique chip identifier and the unique key are generated and hard-coded in the receiver on a one time programmable (OTP) memory before deploying the receiver to be used by a subscriber, wherein the chip key and the unique chip identifier are injected in the chip key server over a secured link, wherein the OTP memory comprises a fuse, and wherein the fuse is configured to disable an output port of the DSCT based on receiving a command from at least one of: a manufacturer of the DSTC and a service provider; and decrypting, at the receiver, each of the plurality of encrypted services using the decrypted service encryption keys.

12. The method of claim 11, wherein each of the encrypted service encryption keys is received with each of the plurality of encrypted services.

13. The method of claim 11, wherein each of the encrypted service encryption keys are received on a first channel and each of the encrypted services are received on a second channel.

14. The method of claim 11, further comprising requesting a service.

15. The system of claim 6, wherein the chip key server comprises a chip key database, the chip key database having a list that correlates the chip key with the chip identifier for each of the digital subscriber communications terminal.

16. The method of claim 11, wherein receiving a plurality of encrypted services comprises receiving the plurality of encrypted services wherein the plurality of encrypted services are encrypted using symmetrical key encryption technique.

17. The system of claim 6, wherein the system is a conditional access system.

\* \* \* \* \*